Aug. 29, 1950  F. R. BEAN  2,520,874
MANUALLY OPERABLE THERMOSTATIC SWITCH ASSEMBLY
Original Filed Oct. 19, 1942
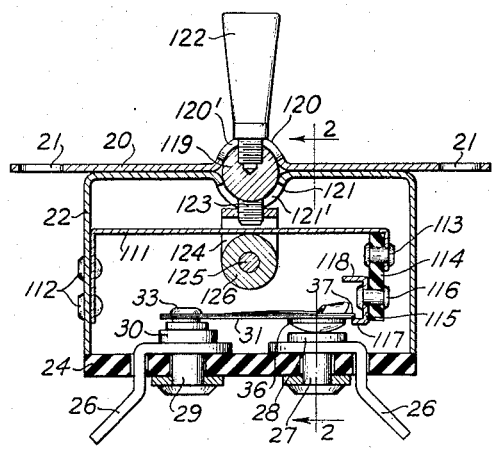
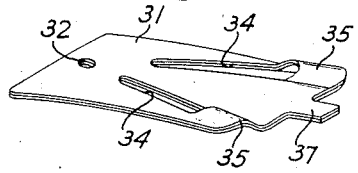
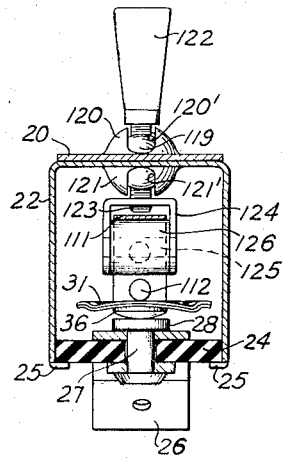
Inventor
Frank Robert Bean
George A. Gillette Jr.
Attorney Patented Aug. 29, 1950

2,520,874

UNITED STATES PATENT OFFICE 2,520,874

MANUALLY OPERABLE THERMOSTATIC SWITCH ASSEMBLY

Frank Robert Bean, Rochester, N. Y., assignor to Fasco Industries, Inc., Rochester, N. Y., a corporation of New York Original application October 19, 1942, Serial No. 462,504. Divided and this application November 7, 1949, Serial No. 126,029

4 Claims. (Cl. 200—113)

1

The present application is a division of my copending application Serial No. 462,504, filed October 19, 1942 for "Manually Operable Thermostatic Switch Assembly." The present invention relates to a manually operable thermostatic switch assembly and more particularly to the combination with a thermostatic switch assembly of a means movable to two or more positions and which may be manually operated to re-set or return the thermostatic element of a thermostatic switch to a closed or operative position.

The use of thermostatically operated switches to interrupt an electric circuit under predetermined and/or abnormal conditions is well known. However, it is also necessary and desirable to manually control the position of the switch element of such an assembly and move the same to an "on" and/or "off" position irrespective of the load conditions in the circuit including the thermostatic element.

The primary object of the present invention is the provision of a manually operable member movable to either of two positions and for rendering the thermostatic element of a thermostatic switch assembly operative when said member is moved to one of its positions.

Another object of the invention is the combination with a switch means including a snap acting thermostatic switch arm, of a manually operable re-set member for permitting or compelling return of said switch arm to a closed position.

A further object is the combination with a switch means having a normally closed thermostatic switch arm, of a manually operab'e resetting member which is also movable to a position to render said switch inoperative.

Still another object is the provision on the manually operable means of a stop or an abutment for modifying the thermal operation of a thermostatic switch assembly.

A still further object of the invention is a switch assembly having a norma'ly closed thermostatic switch arm and manual operable means including an intermediate means for holding said switch arm in open position.

The foregoing and other objects of the invention are embodied in the combination of a thermostatic switch assembly having a normally closed switch arm, a manually operable member movable at least to either of two positions, and an intermediate means operatively connected to said manually movable member. The uses and advantages of such thermostatic switch assembly may be increased by providing a stop or abutment to limit the opening movement of the thermostatic switch arm.

Reference is hereby made to the accompanying drawings wherein similar reference characters designate similar elements and wherein:

Fig. 1 is a vertical longitudinal section of a thermostatic switch assembly including a manually operable member according to the invention.

Fig. 2 is a vertical transverse section taken on the line 2—2 of Fig. 1.

Fig. 3 is a perspective detail of a normally returning thermostatic switch arm.

In general the manually operable thermostatic switch assembly according to the invention comprises a switch means including a thermostatic switch arm, a manually operable member, and an intermediate member. The manually operable member is movable to at least two positions and is operatively connected to said intermediate member which determines the operability of the switch arm according to the position of the manually operab'e member and/or the thermal condition of the thermostatic switch arm. Said switch assembly may be mounted upon an instrument panel or similar support by means of a mounting plate carrying a casing and an insulating base.

The switch assembly may be mounted upon an instrument panel or similar support by means of a mounting plate 20 which is provided with holes 21. A casing 22 having an open side is fastened to said plate 20 in any suitable manner as by spot welding. A base 24 of any suitable insulating material covers the open side of said casing 22. A pair of terminal members 26 are mounted on the base 24 and one of said terminal members 26 has its inner end fastened to base 24 by a rivet 27, the head of which constitutes a contact 28. The other terminal member 26 has its inner end fastened to base 24 by a rivet 29 having an enlarged head 30 on which a thermostatic switch arm 31 is mounted. The other ends of said terminal members 26 may extend through the base 24 for attachment to external conductors or wires of the circuit to be controlled.

The thermostatic switch arm 31 is preferably composed of bimetallic sheet material and is of the snap acting type. Such a switch arm 31 is best shown in Fig. 3 and may be provided with a hole 32 for receiving a stud 33 which may be spun or riveted over to hold said switch arm 31 on head 30. The switch arm 31 is provided with a pair of diverging slots 34 and is deformed with gathered portions 35 at the outer ends of each slot 34 so that said arm 31 is dished or curved longitudinally as shown in Fig. 1 and curved transversely as shown in Fig. 2. Switch arm 31 carries a contact 36 and is arranged so that said contact 36 normally engages contact 28. An integral projection 37 extends from the free end of switch arm 31 for a purpose to be later explained.

The intermediate member comprises a spring arm 111 having one end fastened to casing 22 by rivets 112 and having its other end fastened by a rivet 113 to an insulating plate 114. A stirrup member 115 is fastened to plate 114 by a rivet 116, has one end 117 for engaging the under surface of projection 37 on switch arm 31 and has another end 118 for engaging the upper surface of switch arm 31. The manually operable member comprises a ball 119 mounted in hemispherical formings 120 and 121 respectively in mounting plate 20 and the top of casing 22, a handle 122 extending through a slot 120' in forming 120 and threaded into ball 119, and a threaded stud 123 extending through a slot 121' in forming 121. A U-shaped member 124 has a pin 125 extending between the legs thereof and upon which pin 125 is mounted a roller 126. Said member 124 is screwed onto stud 123 and the spring arm 111 extends between roller 126 and the central portion of member 124.

The normal action of spring arm 111 on roller 126 normally moves handle 122 to its intermediate position shown in Fig. 1. Current above the critical value in thermostatic switch arm 31 will cause the same to open and separate the contacts 28 and 36 but the opening movement of switch arm 31 is limited by end 118 to reduce the time for thermostatic switch arm 31 to cool and return to its normally closed position. The spring arm 111 is comparatively strong with respect to switch arm 31 so that abutment thereof against end 118 does not move said spring arm 111. However, when it is desired to move said switch arm 31 to open position or to hold the same in open position, the manually operable member or handle 122 is swung in either direction whereupon roller 126 raises spring arm 111 and end 117 of member 115 engages the under surface of projection 37 to lift switch arm 31 and open contacts 28 and 36. As soon as the handle 122 is released the intermediate member returns to its normal position and the switch arm 31 either returns to its normally closed position or is intermittently opened if there is an abnormal current in the circuit.

In the switch assembly shown, the mechanical opening of the snap acting thermostatic switch arm 31 by the intermediate and manually operable members causes said switch arm 31 to assume a position like that caused by thermal opening thereof in that the curvature of said switch arm 31 is reversed. Mechanical opening of said switch arm 31 by flexing it in the same or similar manner as by thermal operation has obvious advantages because the switch arm 31 is flexed in the same manner as it is designed to be flexed thermally and the abrupt change in curvature of the switch arm 31 also opens the contacts rapidly.

Since many variations of the invention are possible, the present disclosure shall be construed in an illustrative sense and the scope of the invention is defined by the claims which follow.

What I claim is:

1. In a manually operable thermostatic switch assembly, the combination with a switch means including a bimetallic snap acting arm normally in closed position, of a manually operable member including a pivoted lever movable from a central position to an extreme position, and an intermediate member normally in a position corresponding to the central position of said lever, carrying a stop for limiting the thermal operation of said arm when said intermediate member is in normal position, and also carrying an abutment for moving said arm to open position when said lever is moved to extreme position for moving said intermediate member out of normal position.

2. In a circuit breaker, a support, relatively fixed and movable contacts on said support, means responsive to predetermined conditions for automatically moving said movable contact out of engagement with said fixed contact, manually operable actuating means for said movable contact having lost motion therewith, whereby at one position of said actuating means said movable contact is movable to open and close the circuit by movement relative to said actuating means, and resilient means biasing said actuating means to said one position.

3. In a circuit breaker, a support, relatively fixed and movable contacts on said support, means responsive to predetermined conditions for automatically moving said movable contact out of engagement with said fixed contact, manually operable actuating means for said movable contact, said actuating means mounted on said support for movement into engagement with said movable contact to actuate the same, and resilient means normally maintaining said actuating means spaced from said movable contact and out of the range of automatic movement thereof.

4. In a circuit interrupter, a support, a contact mounted on said support, a bimetal element mounted on said support, said element having a portion adapted to engage said contact and automatically movable out of engagement in response to the passage of currents above a predetermined value through the circuit, manually operable actuating means for said element, said actuating means mounted on said support for movement into engagement with said element to actuate the same, and resilient means normally maintaining said actuating means spaced from said element and out of the range of automatic movement thereof.

FRANK ROBERT BEAN.

REFERENCES CITED

The following references are of record in the file of this patent:

UNITED STATES PATENTS

| Number | Name | Date |
|---|---|---|
| 2,262,397 | Immel | Nov. 11, 1941 |
| 2,348,995 | Parkhurst et al. | May 16, 1944 |
| 2,374,022 | Lee | Apr. 17, 1945 |